(12) United States Patent
Raghavan et al.

(10) Patent No.: US 6,886,129 B1
(45) Date of Patent: Apr. 26, 2005

(54) METHOD AND SYSTEM FOR TRAWLING THE WORLD-WIDE WEB TO IDENTIFY IMPLICITLY-DEFINED COMMUNITIES OF WEB PAGES

(75) Inventors: Prabhakar Raghavan, Saratoga, CA (US); Sridhar Rajagopalan, San Jose, CA (US); Shanmugasundaram Ravikumar, San Jose, CA (US); Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,697

(22) Filed: Nov. 24, 1999

(51) Int. Cl.[7] ............................................... G06F 17/30
(52) U.S. Cl. ...................... 715/501.1; 715/511; 707/3; 707/2
(58) Field of Search .............................. 707/5, 6, 237; 715/500.1

(56) References Cited

U.S. PATENT DOCUMENTS

| | | | |
|---|---|---|---|
| 6,138,113 A | * 10/2000 | Dean et al. | 707/2 |
| 6,321,220 B1 | * 11/2001 | Dean et al. | 707/3 |
| 6,460,034 B1 | * 10/2002 | Wical | 707/5 |
| 6,505,191 B1 | * 1/2003 | Baclawski | 707/3 |
| 6,665,837 B1 | * 12/2003 | Dean et al. | 715/501.1 |

OTHER PUBLICATIONS

Soumen Chakrabarti, Automatic resource compilation by analyzing hyperlink structure and associated text, 1998, Proceedings of the 7th World Wide Web Conference, IBM, pp. 1–13.*

Authoritative Sources in a Hyperlinked Environment, Jon M. Kleinberg Proceedings of the ACM–SIAM Symposium on Discrete Algorithms, 1998.

Inferring Web Communities from Link Topology, David Gibson et al. Proceedings of the Ninth ACM Conference on Hypertext and Hypermedia, 1998.

Fast Algorithms for Mining Association Rules, Rakesh Agrawal et al. Proceedings of the Very Large Database Conference, 1994.

Querying the World Wide Web, Alberto O. Mendelzon et al., International Journal on Digital Libraries, No. 1, vol. 1, 1997.

The Lorel Querry Language for Semistructured Data, Serge Abiteboul et al., International Journal on Digital Libraries, No. 1, vol. 1, 1997.

Silk from Sow's Ear: Extracting Usable Structures from the Web, Peter Pirolli et al., Proceedings of the ACM Sigchi Conference on Human Factors in Computing, 1996.

The Connectivity Server: Fast Access to Linkage Information on the Web, Krishna Bharat et al., Proceedings of the 7th World Wide Web Conference, Australia, 1998.

Automatic Resource Compilation by Analyzing Hyperlink Structure and Associated Text, Soumen Chakrabarti et al., Proceedings of the 7TH World Wide Web Conference, Australia, 1998.

* cited by examiner

Primary Examiner—Stephen S. Hong
Assistant Examiner—Matthew Ludwig
(74) Attorney, Agent, or Firm—Khanh Q. Tran; Mark C. McCabe (57) ABSTRACT

A method and system for identifying groups of pages of common interest from a collection of hyper-linked pages are disclosed. A plurality of community cores are identified from the collection where each core includes first and second sets of pages, and each page in the first set points to every page in the second set. Each identified core is expanded into a full community which is a subset of the pages regarding a particular topic. The identification communities cores is based on the analysis of the Web graph in which the communities correspond to instances of Web subgraphs. Extraneous pages are then pruned to improve the quality of the resulting communities.

30 Claims, 5 Drawing Sheets

METHOD AND SYSTEM FOR TRAWLING THE WORLD-WIDE WEB TO IDENTIFY IMPLICITLY-DEFINED COMMUNITIES OF WEB PAGES

FIELD OF THE INVENTION

The present invention relates to identifying information on the World-wide Web, and in particular to a method and system for trawling the Web to identify implicitly defined communities of Web pages concerning topics of common interest.

BACKGROUND OF THE INVENTION

The World-wide Web has several thousand well-known, explicitly-defined communities, i.e., groups of individuals who share a common interest, together with the Web pages most popular amongst them. Consider for instance, the community of Web users interested in Porsche Boxster cars. Indeed, there are several explicitly-gathered resource collections, such as those listed under the category of "Recreation: Automotive: Makes and Models: Prosche: Boxster" at the Yahoo Web site (yahoo.com), which are devoted to the Boxster. Most of these communities manifest themselves as new groups, Web rings, or as resource collections in directories such as Yahoo! and Infoseek, and as homesteads on Geocities. Other examples include popular topics such as "Major League Baseball," or the somewhat less visible community of "Prepaid phase card collectors". The explicit nature of these communities makes them easy to find. It is simply a matter of visiting the appropriate portal or news groups.

Even with such a large number of explicitly-defined communities on the Web, there are still several tends of thousands of other implicitly-defined communities due to the distributed and almost chaotic nature of the content-creation on the Web. Such implicitly-defined communities often focus on a level of detail that is typically far too fine to attract the current interest (and resources) of large portals to develop long lists of resource pages for them. Viewed another way, what is needed are methods for identifying Web communities at a far more nascent stage than do systematic and institutionalized ontological efforts.

There are at least three reasons for systematically extracting such communities from the Web as they emerge. First, these communities provide valuable and possibly the most reliable information resources for a user interested in them. Second, they represent the sociology of the Web: studying them gives insights into the intellectual evolution of the Web. Finally, portals that identify and distinguish between these communities can target advertising at a very precise level.

These implicit communities seem to outnumber the explicit ones by at least an order of magnitude. It appears unlikely that any explicitly-defined manual effort can successfully identify and bring order to all of these implicit communities, especially since their number will continue to grow rapidly with the Web. Indeed, as shown later in the specification, such communities sometimes emerge in the Web even before the individual participants become aware of their existence.

There are several technologies that are of interest in identifying implicit communities on the Web. One of these relies on the analysis of the link structure of the Web pages. A number of search engines and retrieval projects have also used links to provide additional information regarding the quality and reliability of the search results. See, for instance, the HITS algorithm described in "Authoritative Sources In A Hyperlinked Environment," by J. Kleinberg, Proceedings of the 9th ACM-SIAM Symposium on Discrete Algorithms (SODA), 1998, and "Automatic Resource Compilation by Analyzing Hyperlink Structure and Associated Text," by Chakrabarti et al., Proceedings of the 7th World-Wide Web Conference, Australia, 1998. The connectivity server described by Bharat et al. also provides a fast index to linkage information on the Web. See, for example, "The Connectivity Server: Fast Access To Linkage Information On The Web." Proceedings of the 7th World-Wide Web Conference, Australia, 1998. Although link analysis was used as a search tool, it has never been applied for mining the community structure of the Web.

Another related area is information foraging. Prior work in information foraging generally have a few main themes. The first is the information search and foraging paradigm, originally proposed in the Web context by Pirolli et al. in the paper "Silk From A Sow's Ear: Extracting Usable Structures From The Web," Proceedings of the ACM SIGCHI Conference on Human Factors in Computing, 1996. Here, the authors show that Web pages fall into a number of types characterized by their role in helping an information forager find and satisfy his/her information need. The categories are much finer than the hub and authority view taken by Kleinberg and Chakrabarti et al. They also find that the classification of Web pages into specified types provides a significant "value add" to the browsing and foraging experience. Their techniques, however, appear unlikely to scale to the size of data currently existing on the World-wide Web.

A view of the Web as a semi-structured database has also been advanced by several authors. See, for example, "The Lorel Query Language For Semistructured Data," S. Abiteboul et al., International Journal on Digital Libraries, pages 68–88, No. 1, Vol. 1, 1997 and "Querying the World Wide Web," Mendelson et al., International Journal of Digital Libraries, pages 54–56, No. 1, Vol. 1, 1997. These views support a structured query interface to the Web, which is evocative of and similar to Structured Query Language (SQL). An advantage of this approach is that many interesting queries, including methods such as HITS (ref.), can be expressed as simple expressions in the very powerful SQL syntax. The corresponding disadvantage is that this generality comes with an associated computational cost which is prohibitive in the our context.

Another system, Squeal, was described by Ellen Spertus in "ParaSite: Mining the Structural Information On the World-Wide Web," PhD, Thesis, MIT, February 1998, where it is built on top of a relational database. The relations that are extracted by this system and maintained in the underlying database allow for the mining of several interesting pages and interesting structures in the Web graph. Again, the value of such a system is in providing a more powerful interface which allows the relatively simple specification of interesting structures in the Web graph. However, the generally of the approach is a primary inhibiting factor in scaling it to large data sets.

Traditional data mining techniques may also be considered to search the Web for hidden communities, such as the one described by Agrawal et al. in the paper entitled "Fast Algorithms For Mining Association Rules," Proceedings of the Very Large Data Base Conference, Santiago, Chile, 1994. Data mining, however, focuses largely on algorithms for inferring association rules and other statistical correlation measures in a given dataset. The notion of trawling differs from data mining in several ways. On one hand, trawling concerns with finding structures that are relatively rare, i.e., the graph-theoretic signatures of communities being looked for number perhaps only a handful for any single community. Second, exhaustive search of the solution space is infeasible, even with efficient methods such as a priori described by Agrawal et al. Unlike market baskets, where there are at most about a million distinct items, there are between two to three orders of magnitude more "items", i.e., Web pages, in this case. Finally, the relationship that one would be interested in, namely co-citation, is effectively the join of the Web "points to" relation and its transposed version, the Web "pointed to by" relation. The size of this relation is potentially much larger than the original "points to" relation. Thus, one would need a method that works implicitly with the original "points to" relation, without ever computing the co-citation relation explicitly. The issue then is to find trawling methods that scale to the enormous size of the World-wide Web.

The work of Mendelson et al. described in "Finding Regular Simple Paths in Graph Databases," SIAM J. Comp. 24(6), 1995, pages 1235–1258, is an instance of structural methods in mining. The authors show that the traditional Structured Query Language (SQL) interface to databases is inadequate for specifying several structural queries that are interesting in the context of the Web. An example in the paper is the path connectivity between vertices that are subject to some constraints on the sequence of edges on the path (expressed as a regular expression). They show that structures such as these can be described in a more intuitive and graph-theoretic query language G+. The authors also provide several interesting algorithms and intractability results that relate to this and similar query languages. These algorithmic methods, although are very general, do not support the scale and efficiencies required for identifying implicit Web communities.

In the paper titled "Inferring Web Communities From Link Topology," Proc. of the 9th ACM Conference on Hypertext and Hypermedia, 1998, Gibson et al. describe experiments on the Web where they use spectral methods to extract information about "communities" in the Web. The non-principal eigenvectors of matrices described by Kleinberg in "Authoritative Sources In A Hyperlinked Environment," Proc. of the 9th ACM-SIAM Symposium on Discrete Algorithms (SODA), 1998, are used to define the communities. It is shown that the non-principal eigenvectors of the co-citation matrix reveal interesting information about the fine structure of a Web community. While eigenvectors seem to provide useful information both in the context of search and clustering in purely text corpora as well, they can be computationally expensive on the scale of the Web. In addition, they need not be complete, i.e., instances of interesting structures could be left undiscovered. Unlike "false positives", this may not be a problem as long as not too many communities are missed.

Therefore, there remains a need for a method and system for traveling the Web to identify implicitly defined communities of Web pages concerning specific topics of general interest, without the above-described drawbacks.

SUMMARY OF THE INVENTION

It is an object of the present invention to provide a method for identifying implicitly defined communities from a collection of hyper-linked pages.

It is another object of the invention to provide a method for identifying community cores which can be expanded into full communities, each concerning a particular topic of interest.

It is still another object of the invention to generate candidate fan pages and candidate center pages from which the community cores are identified.

It is a further object of the invention to prune extraneous resulting pages to achieve a set of high-quality communities.

To achieve these and other objects, the present invention provides a method for identifying and enumerating groups of pages of common interest from a collection of hyper-linked pages, including the steps of: (a) identifying community cores from the collection where each core includes first and second sets of pages and each page in the first set points to every page in the second set; and (b) expanding each identified core into a full community which is a subset of the pages regarding a particular topic. To minimize the number of duplicate pages, in the hyper-links between any two pages on the same site are removed. In addition, the pages of more established sites are discarded because they might skew the results. Highly similar pages are replaced with a single page that is representative of the replaced pages, with the hyper-links previously pointing to the replaced pages now pointing to the representative page.

To identify the community cores, a set of candidate fan pages and a set of candidate center pages are generated where each fan page points to at least a predetermined number of different sites and each center page is pointed to by one or more candidate fan pages. The fan pages are preferably determined based on the page content and hyper-links pointing therefrom. All pages in the collection are discarded except the candidate fan pages and candidate center pages. A set of (i, j)-cores are determined where i and j are the numbers of candidate fan pages and candidate center pages, respectively, that appear in each identified community core. The (i, j)-cores are found by discarding all candidate center pages that have fewer than i hyper-links pointing from the pages, and determining all candidate center pages that have i hyper-links pointing from therefrom and whether the i hyper-links represents a valid community core. If they represent a valid community core, then the core is output, otherwise the determined candidate center pages are discarded. Similarly, all candidate fan pages that have fewer than j hyper-links originating therefrom are discarded. The method determines all candidate fan pages with j hyper-links originating therefrom and whether the j hyper-links represent a valid community core. It these hyper-links represent a valid community core, then it is output, otherwise the determined candidate fan pages are discarded. The process of discarding candidate fan and center pages is repeated until every candidate fan page has more than j hyper-links originating from them and every candidate center page has more than j hyper-links pointed to them.

Additional objects and advantages of the present invention will be set forth in the description which follows, and in part will be obvious from the description and the accompanying drawings, or may be learned from the practice of this invention.

DESCRIPTION OF THE PREFERRED EMBODIMENT

The invention will be described primarily as a method for trawling the Web to identify and enumerate implicitly defined communities (or groups) of Web pages concerning topics of common interest, using Web graphs. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Initially, community cores are identified from the Web pages where each core includes two sets of pages, and each page in one set points to every page in the other set. Each identified core is then expanded into a full community which is a subset of the pages regarding a particular topic. The identification of community cores is base don the analysis of a Web graph in which the communities correspond to instances of Web subgraphs. Extraneous pages are then pruned to improve the quality of the resulting communities. To facilitate the explanation of the invention, some observations about subgraphs pertaining to the invention are first discussed. Preferred embodiments of the invention and their performance will then be described.

Strong-connected bipartite subgraphs and cores

A critical observation that motivates the present invention is that Web sites that are part of the same community frequently do not reference one another. This is due to competitive reasons or conflicting points of view. For instance, the Web pages of groups having opposite political or social view points typically do not refer to each other. In the case of emerging communities on less obvious topics, even pages that might otherwise point to one another frequency do not point to each other simply because their creators are not aware of each other.

Linkage between the related pages can nevertheless be established by a different phenomenon that one can observe on the Web: pages focusing on the same them frequently contain hyperlinks to the same pages. For instance, as of 12/1/98 the sites swim.org/church.html, kcm.co.kr/search/html, korrea.html, and cyberkorean.com/church all contain links to numerous Korean churches. This phenomenon is referred to as co-citation, which originated in the bibliometrics literature. See, for instance, Bibliometrics, Annual Review of Information Science and Technology, volume 24, pages 119–186, Elsevier, Amsterdam, 1989. Co-citation suggests that related pages are frequently referenced together. This is even more true in the Web world where linking is not only indicative of good academic discourse, but the essential element that distinguishes the Web as a corpus from other text corpora. For example, the corporate home pages of AT&T and Sprint typically do not reference each other. On the other hand, these pages are very frequently "co-cited". Co-citation is not just a characteristic of well-developed and explicitly-known communities (such as the ones listed above) but an early indicator of newly emerging communities. In other words, the structure of such co-citation in the Web graph can be exploited to extract all communities that have taken shape on the Web, even before the participants have realized that they have formed a community through their co-citation.

There is another property that distinguishes references in the Web. Linkage on the Web represents an implicit endorsement of the document pointed to. While each link is not an entirely reliable value judgment, the sum collection of the links is a very reliable and accurate indicator of the quality of the page.

Mathematically, the above properties can be described as follows. Web communities are characterized by dense directed bipartite graphs. Every directed edge in the graph is directed from a node u in F to a node v in C where F and C denote two sets of nodes in the graph. A bipartite graph is dense if many of the possible edges between F and C are present. The following hypothesis can then be derived: the dense bipartite graphs that are signatures of Web communities contain at least one core, where a core is a complete bipartite subgraph with at least i nodes from F and at least j nodes from C (recall that a complete bipartite graph on node-sets F, C contains all possible edges between a vertex of F and a vertex of C). For the present, the values i, j are left unspecified. Thus, the core is a small (i, j)-sized completely bipartite subgraph of the community. A community may be identified by first finding its core, and then using the core to find the rest of the community. The second step, finding the community from its core, can be done, for instance, by using a method derived from the Clever algorithm (see, for example, the assignee's pending application Ser. No. 09/143,733). This step will not be described in detail here. The description of the invention instead will focus on the processes for efficiently finding community cores from the Web graph.

The invention is based on two observations about random bipartite graphs:

1) Let B be a random bipartite graph with edges directed from a set L of nodes to a set R of nodes, with m random edges each placed between a vertex of L and a vertex of R under any probability distribution. Then there exist i and j that are functions of ($|L|$, $|R|$, m) such that with high probability, B contains i nodes from L and j nodes from R forming a complete bipartite subgraph.

The values of i and j, and the high probability can be derived, for example, as follows. If $|L|=|R|=10$ and m=50, then with probability more than 0.99, i and j will be at least 5. This fact holds no matter how the m random edges are distributed in the potential slots between the nodes of L and R.

2) A random large enough and dense enough bipartite directed subgraph of the Web almost surely has a core.

This observation motivates the finding of large numbers of Web communities by enumerating all cores in the Web graph. Note that a community may have multiple cores and that the cores sought are directed. That is, there is a set of i pages all of which hyperlink to a set of j pages, while no assumption is made of links out of the latter set of j pages. Intuitively, the former are pages created by members of the community, focusing on what they believe are the most valuable pages for that community (of which the core contains j). For this reason, the i pages that contain the inks are referred to as fans, and the j pages that are referenced are referred to as centers (as in community centers).

Web structure and modeling a) Fans:

In crawling the Web, the method of the invention first scan through the data set and summarizes the identifies and content of all potential fans. A fan may be viewed as a specialized hub, i.e., extensive resource lists discovered by algorithms such as HITS and Clever. The hubs output by these algorithms are analyzed to look for good hubs. A defining characteristic of good hubs is that they all contain many non-nepotistic links to good resources. Non-nepotistic links are those pointing to pages on other sites. In the preferred embodiment of the invention, a page is a potential fan page if it has links to at least 6 different Web sites (a Web site is the first field of the URL). For each fan page, only the sequence of hyperlinks occurring in that page is retained while all other information is discarded. A fan page refers to a sequence of links devoid of all other content. At any point in the trawling process, the set of potential fans remaining in contention implies a set of potential centers remaining in contention: namely, those links listed in the current set of potential fans.

(b) Mirror and Shingles

Many existing communities are mirrored repeatedly, both in their fans and in their centers. In addition, since it is rather easy to reproduce the content of a Web page with minor variations, many pages are reproduced in slightly modified forms. Thus, the invention employs a shingling step to identify and eliminate such duplicates, which is applied to the sequence of links in a page rather than to the entire page. The shingling process constructs a number of local hashes of the Web page and compares smallest few hash values (called shingles) to detect duplication. With a carefully chosen hash function and number of shingles, exact and almost-exact duplicates can be detected with a high probability. On the other hand, two very different pages are almost never accidentally determined as a duplication.

However, a page that is approximately mirrored, say, three times, can produce a very large spurious core, e.g., a (3, k)-core where k can be large and would be the number of links preserved in all the mirrorings. Consequently, a very aggressive mirror-elimination strategy should be chosen. The number of shingles maintained by the method of the invention is rather small: only 2 per page. Furthermore, a relatively small local window (5 links) is used over which to compute the shingles. While these aggressive choices for the shingle algorithm parameters can and probably do result in a few distinct pages being misidentified as mirrors, it detects almost all mirrors and near mirrors reliably. Thus, the problem posed by near mirrors generating spurious communities is effectively dealt with.

(c) In-degree distribution

Figure 1:
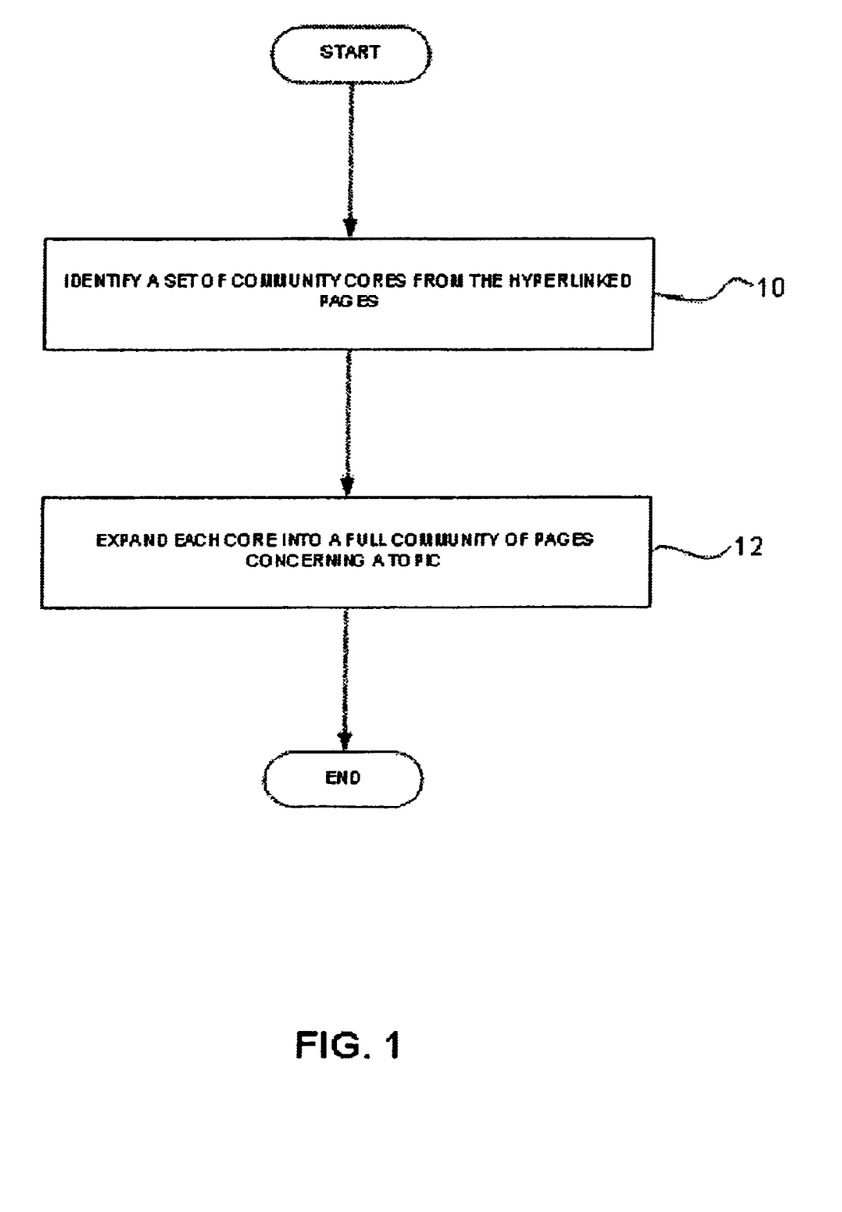
FIG. 1 is a flow chart showing the general operation of the method for trawling the Web to identify implicitly defined communities based on graphs representing the Web, according to the present invention.
Figure 2:
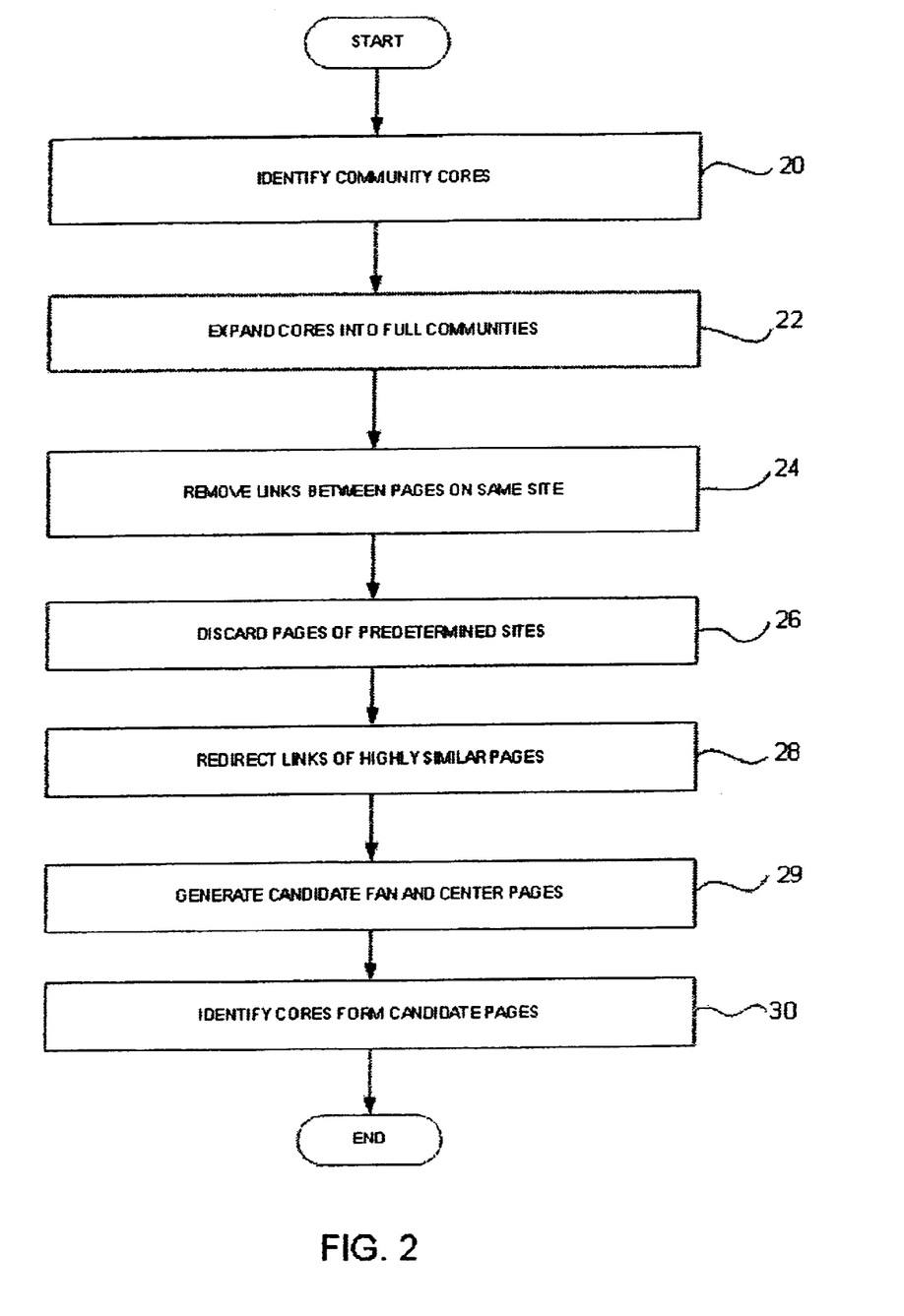
FIG. 2 is a flow chart showing a preferred embodiment for the method of identifying the implicitly defined communities and pruning undesired pages according to the present invention.
Figure 3:
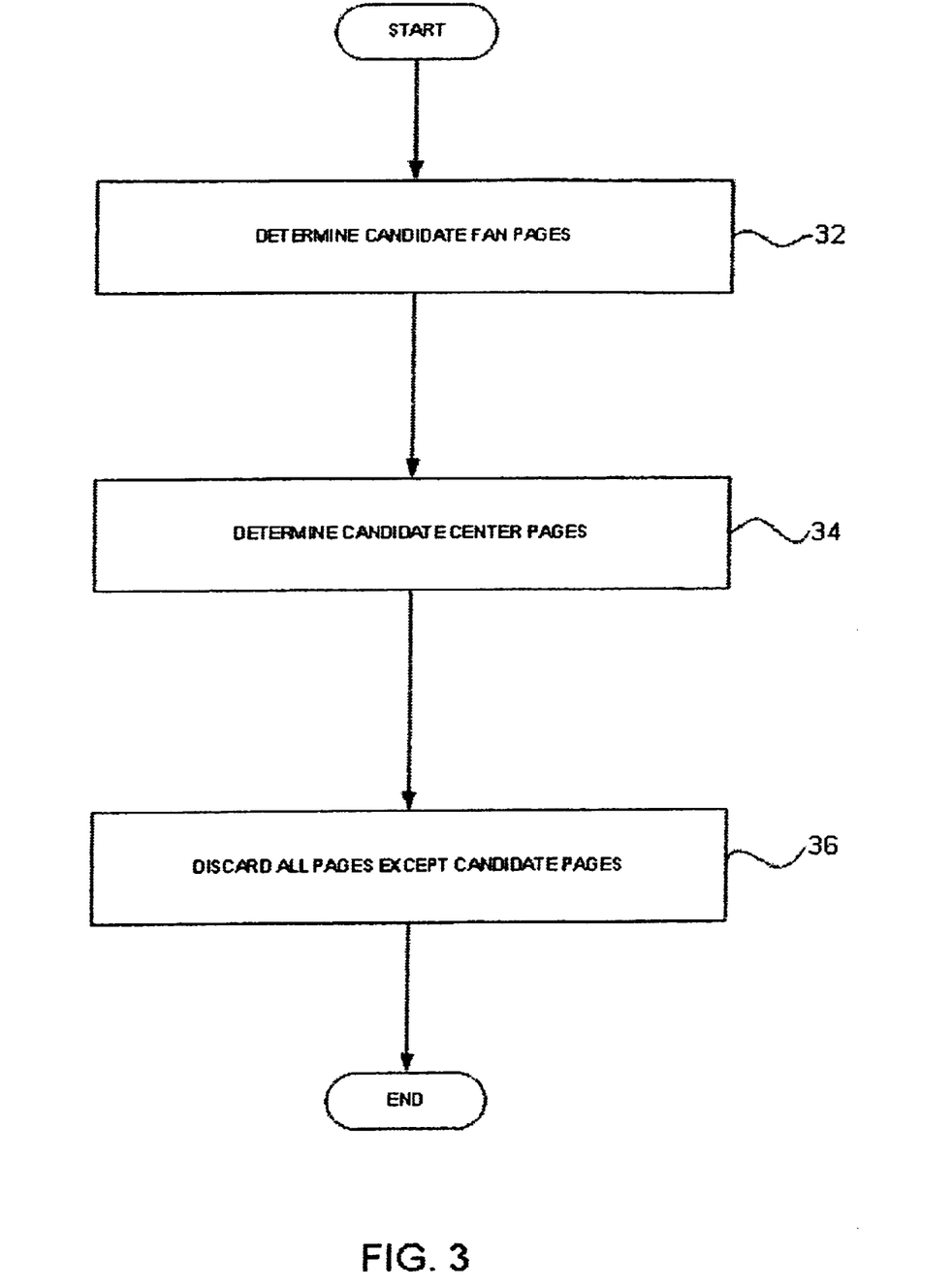
FIG. 3 is a flow chart representing a preferred process for discarding undesired pages from consideration to generate candidate fan pages and candidate center pages.
Figure 4:
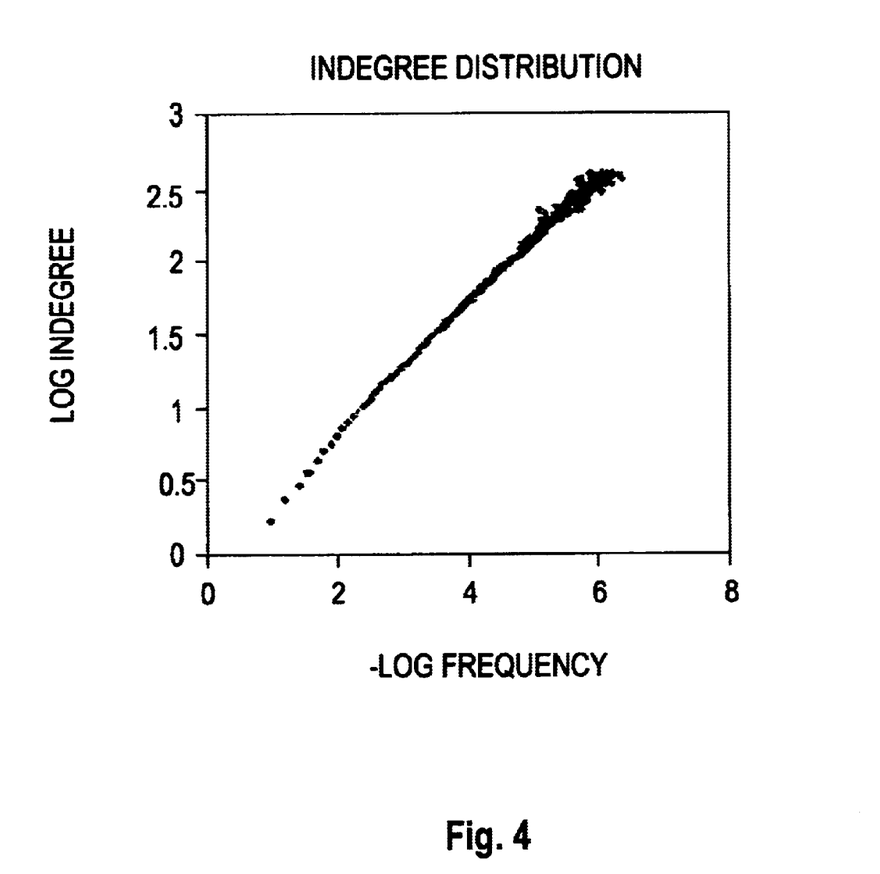
FIG. 4 is a graph showing the in-degree distribution of the Web pages.

The first approach to trimming down the resulting data came from an analysis of the in-degrees of Web pages. The distribution of page in-degrees has a remarkably simple rule, as can be seen in the chart of FIG. 4. This chart includes pages that have in-degree of most 410. For any integer k larger than 410, the chance that a page has in-degree k is less than 1 in a million. These unusually popular pages (e.g., yahoo.com) with many potential fans pointing to them have been excluded. The chart suggests a simple relation between in-degree values and their probability densities. Indeed, as can be seen from the remarkably linear log-log plot, the slope of the curve is close to ½. This leads to the following empirical fact: the probability that a page has in-degree i is roughly $1/i^2$.

Although the precise exponent is slightly larger than 2, it is chosen to be 2 in the preferred embodiment of the invention. Also, by elementary probability, it can be seen that the chance that a page has degree at least i is proportional to $1/i$.

(d) Pruning centers by in-degree

As described earlier, known and established communities typically contain relatively dense bipartite cores. (This is one of the reasons why algorithms such as HITS and Clever work very well on broad topic queries for which there is a significant Web presence in terms of number of pages that address the topic.)

However, large and dense bipartite graphs can and do contain many instances of the small cores that we are looking for. This creates an implementation problem: if an algorithm were to list all possible cores in the Web graph, then most of the cores corresponded to very "high-level" communities (e.g., Physics). It would be difficult to find and distinguish those that were emerging or new from the rest. The invention includes a pruning by in-degree to address this problem. This step deletes all pages that are very highly referenced on the Web, such as the home pages of Web portals (e.g., Yahoo! or Altavista). These pages are presumably referenced for a variety of reasons not having to do with any single emerging community, and hence can safely be eliminated from further consideration. (On the other hand, if they are retained, the odds of discovering spurious "communities" increase because pages on various subjects may contain links to these sites just for the creators' convenience.) Therefore, all pages that have an in-degree greater than a carefully-chosen threshold k are eliminated as potential centers. The issue, then, is the particular choice for the value of k.

It can be seen that the pages listed in a Web directory such as Yahoo! are relatively uninteresting from the point of view Web trawing because these pages belong to communities that are already developed and explicitly known. Assume that directory services that list explicitly-known communities, like Yahoo, include about 25 million pages while the total number of pages in the Web today is about 1 billion. Thus, the chance that a page is already known to be part of an explicitly-known community is about 1 in 40. From the above empirical fact, such a node would have in-degree 40 or larger. While the exact constants are not of interest here, this calculation indicates that the correct choice for k is in the tens, not hundreds or thousands. If k is chosen to be 50, then all pages that have in-degree 50 or larger are pruned from further consideration as centers.

Trawling

Thus far, several preliminary processing steps on the data have been described, along with some interesting phenomena on degree distributions on the Web graph. The trawling of this "cleaned up" data for communities is now described in detail. The test data still has over 2 million potential fans remaining, with over 60 million links to over 20 million potential centers. Since there are still several million potential fans, it is not practical to enumerate the communities in the form "for all subsets of i potential fans, and for all subsets of j potential centers, check if a core is induced". A number of additional pruning steps are therefore necessary to eliminate much of this data, while retaining the property that the eliminated nodes and links cannot be part of any core that is not explicitly identified and output before they are pruned. After the data is reduced by another order of magnitude in this fashion, enumeration of the communities may begin.

A critical requirement of the method of the invention is that it can be implemented in a small number of steps, where in each step the data is processed in a stream from disk and then stored back after processing onto disk. Main memory is thus used very carefully. The only other operation allowed is a sort of the dataset, which is an efficient operation in most computers.

a) Iterative pruning

When look for (i, j) cores, clearly any potential fan with an out-degree smaller than j can be pruned and the associated edges deleted from the graph. Similarly, any potential center with in-degree smaller than i can be pruned and the corresponding edges deleted from the graph. This process can be done iteratively: when a fan gets pruned then some of the centers that it points to may have their in-degrees fall below the threshold i and qualify for pruning as a consequence. Similarly when a center gets pruned, a fan that points to it could have its out-degree fall below its threshold of j and qualify for pruning. While there is an obvious way to do this kind of pruning on small datasets, it fails when the dataset becomes large and does not fit into main memory. Since the test dataset is too large to fit into the computer main memory, each URL is represented by a 64-bit hash value. (Smaller-sized hashes have a significant chance of collision.) Thus, each edge in the Web graph will occupy 128 bits in storing a (source page, destination page) pair. Although such many bits are not required in any absolute sense (since edges that share a source or a destination can in principle be grouped together), this number of bits used is a good choice if the edges need to be indexed by both the source and by the destination. A compressed hashing may be used for storing URL's to generate various forms of connectivity information. With 512 Mbytes of computer main memory, about 40 million edges can be represented in the memory. This is about an order of magnitude too small if the experiment is scaled to the whole Web.

Thus, it is necessary that the pruning algorithms can efficiently stream the data between secondary and main memory. Conveniently, the iterative pruning process can be reduced to sorting repeatedly. The edge list is first sorted by source, with the fans that have low out-degree eliminated by streaming through the data. The result is next sorted by destination, with the centers having a low in-degree being eliminated. The result is then sorted by source again, and then again by destination and so on until only few fans and centers are eliminated in each iteration. In fact it may not necessary to sort repeatedly. It suffices to remember and index in memory all the pruned vertices (or more generally, only as many vertices as the main memory can hold are pruned in each pass). This process results in two data sets containing identical data, where the edges in one set are sorted by source, and by destination in the other. These data sets are alternately scanned to identify and prune pages that do not meed the in-degree or out-degree threshold. The vertices being pruned in each iteration in memory is indexed. This results in a significant improvement in execution time, because there are only two calls to a sorting routine.

The fact that this form of pruning can be reduced to a computation on a data stream and sorting is significant. It would be impossible to do this pruning using a method that requires the indexing of edges by source, by destination, or both. Such an index would necessarily have to be on disk and accesses to it could prove to be expensive due to the non-locality of disk access. Designing a method which streams data efficiently through main memory is relatively simple in the case of iterative pruning. It is considerably more challenging when the pruning strategy becomes more sophisticated, as in the case of inclusion-exclusion pruning which is described next.

b) Inclusion-exclusion pruning

The next pruning strategy, referred to as inclusion-exclusion pruning, has the following useful property: at every step, either a page is eliminated from contention or an (i, j) core is discovered and output. Hence the name inclusion-exclusion: at each step, either a community is included or a page is excluded from further contention (as either a fan or as a center) by establishing that it cannot be a part of any core. An important benefit of such pruning is that every step represents useful progress, either in discovering a community or in pruning the data. Note again that the aglorithm must be implementable without relying on holding all of the data in main memory.

The fans (or centers) chosen for inclusion-exclusion pruning are those whose out-degrees (or in-degrees) are equal to the threshold j. It is relatively simple to check if these nodes are part of any (i, j) core. Consider a fan x with out-degree exactly j, and let N(x) denote the set of centers it points to. Then, x is in an (i, j) core if and only if there are i-1 other fans all pointing to each center in N(x). For small values of i and j and given an index on both fans and centers, this condition can be easily checked. The computation is simply computing the size of the intersection of j sets and checking it the cardinality is at least i. The issue here is how two indices in main memory can be avoided.

First, notice that simultaneous access to both indices is not necessary. The reason is that the fans with out-degree j can be eliminated first before the centers with in-degree i are handled. That is, first, from the edge list sorted by the source id, the method detects all the fans with out-degree j. For each such fan, it outputs the set of j centers adjacent to the fan. An index on the destination id is used to generate the set of fans pointing to each of the j centers and to compute the intersection of these sets.

A somewhat more careful investigation reveals that all of these intersection computations can be batched. From a linear scan of the edges sorted by source, the method find fans of out-degree exactly j. For as many of the fans as will fit in memory, it indexes those edges sources at the fan by destination id's. At this stage, an index by centers is formed in the system memory which for each center contains fans adjacent to then which have out-degree exactly j. This is a much smaller index: it contains only edges that are adjacent to fans of out-degree exactly j.

The result is a set of vertices corresponding to each fan whose edges have been indexed. Recall that each retained fan x is adjacent to exactly j centers. This allows a dual condition equivalent to the condition above to be considered.

Fact: Let $\{c1, c2, \ldots, cj\}$ be the centers adjacent to x and N(ct) denote the neighborhood of ct, the set of fans that point to ct. Then, x is part of a core if and only if the intersection of the sets N(ct) has size at least i.

This fact will be used to determine which of the fans that have been chosen qualify as part of a community. If there is fan qualifies, then the community is output. If not, nothing is output. In either case, the fan can be pruned. It turns out that this condition can be verified efficiently by batching many fans together.

A set S(x) corresponding to each fan x is maintained. Initially, all sets are initialized to the complete set. Of course, this is represented symbolically. The goal is that at the end of the computation, the set corresponding to the fan x will be the intersection of the sets N(ct).

The process for streaming through the edges stored by destination can be described as follows. For each destination y, check if it is in the small index. If so, then there is at least one fan of out-degree exactly j adjacent to it. If not, edges adjacent to y are meaningless in the current pass. Assume therefore that y is in the index. For each degree j fan x adjacent to y, intersect the set of fans adjacent to y with the set corresponding to x. That is, S(x) is intersected with N(y). Recall that since the edges are sorted by destination, N(y) is available as a contiguous sequence in the scan.

At the end of this batched run, S(x) is the set required to verify the above stated fact for every x. For vertices x whose sets, S(x), have size at least i, the S(x) corresponds to the fans in the cores they belong to. In this case, the community is output immediately. In either case, x can be pruned. Optionally, all the fans that belong in some community that are output can also be pruned. Thus, the following interesting fact results: inclusion-exclusion pruning can be reduced to a two passes over the dataset separated by a sort operation.

The following observations can be made concerning all the pruning steps up until this point. First, given any graph, no cores are eliminated by the above pruning steps before they are output. Secondly, the running time of the above pruning steps is linear in the size of the input plus the number of communities produced in these steps. Thirdly, the set of cores generated so far is complete in that no cores are missed. This is not always a desirable property, especially if many "false positives" are produced. However, the test results show that this was not a problem in this case. Finally, the process up until this point is output-sensitive: the running time (besides being linear in the size of the input) grows linearly in the size of the output. In other words, constant time is spent per input item, and constant time is spent per core produced (if i and j are viewed as constants independent of the size of the input, namely the Web).

c) Core generation and filtering

The inclusion-exclusion pruning step generates a number of cores. Table 1 shows the number of cores that were output during inclusion-exclusion pruning, for various values of i and j. Communities that have a fixed value of j are also largely disjoint from each other (due to the way the inclusion-exclusion pruning is done). Thus, the above method for traveling the Web has extracted about 135,000 communities (summing up communities with j=3).

Next, nepotistic cores are removed. A nepotistic core is one where some of the fans in the core come from the same Web site. The underlying principle is that if many of the fans in a core come from the same Web site, this may be an artificially established community serving the ends (very likely commercial) of a single entity, rather than a spontaneously-emerging Web community. For this purpose, the following definition of "same Web site" is used. If the site contains at most three fields, for instance, yahoo.com, or ibm.com then the site is left as is. If the site has more than three fields, as in yahoo.co.uk, then the first field is dropped. The last column of Table 1 represents the number of non-nepotistic cores. As can be seen, the number of nepotistic cores is significant, but not overwhelming. About half the cores pass the nepotism test.

TABLE 1

| i | j | Prefilter number of Community Cores | Postfilter number of Community Cores |
| --- | --- | --- | --- |
| 3 | 3 | 89565 | 38887 |
| 3 | 5 | 70168 | 30299 |
| 3 | 7 | 60614 | 26800 |
| 3 | 9 | 53567 | 24595 |
| 4 | 3 | 29769 | 11410 |
| 4 | 5 | 21598 | 12626 |

TABLE 1-continued

| i | j | Prefilter number of Community Cores | Postfilter number of Community Cores |
| --- | --- | --- | --- |
| 4 | 7 | 17754 | 10703 |
| 4 | 9 | 15258 | 9566 |
| 5 | 3 | 11438 | 7015 |
| 5 | 5 | 8062 | 4927 |
| 5 | 7 | 6626 | 4071 |
| 5 | 9 | 5684 | 3547 |
| 6 | 3 | 4854 | 2757 |
| 6 | 5 | 3196 | 1795 |
| 6 | 7 | 2549 | 1425 |
| 6 | 9 | 2141 | 1206 |

The cores found should be but a fraction of those on today's Web, for two reasons. First, the size of the crawl used for evaluating the invention is significantly smaller than estimated sizes for today's Web. Second, this crawl is about a year and a half old. The Web has grown tremendously since the crawl. Assuming conservatively that the number of pages on the Web has doubled since our crawl, while linkage density remains roughly the same over this periods, today's cores should be at least twice the number in our crawl.

d) Core enumeration

After the inclusion-exclusion pruning step, about 5 million unpruned edges remain when looking for (3, 3) cores (the case when the largest number of unpruned edges is left). The method now can explicitly enumerate all cores in the graph induced by these 5 million edges. This final step is now described briefly. The cores are built iteratively, with each core being identified by fixing a value for j and enumerating the core fans. Consider an (i, j) core. Let x1, x2 . . . , $x_i$ be the fans in this core. Let X be any subset of $\{x_t: t < (i+1)\}$, the set of fans in this core. Let i' be the size of X. Then, X is the fan side of an (i',j) core. This means that every subset of the fans in a core forms a core of smaller size. Consequently, the precondition required to run the a priori algorithm is satisfied.

Figure 5:
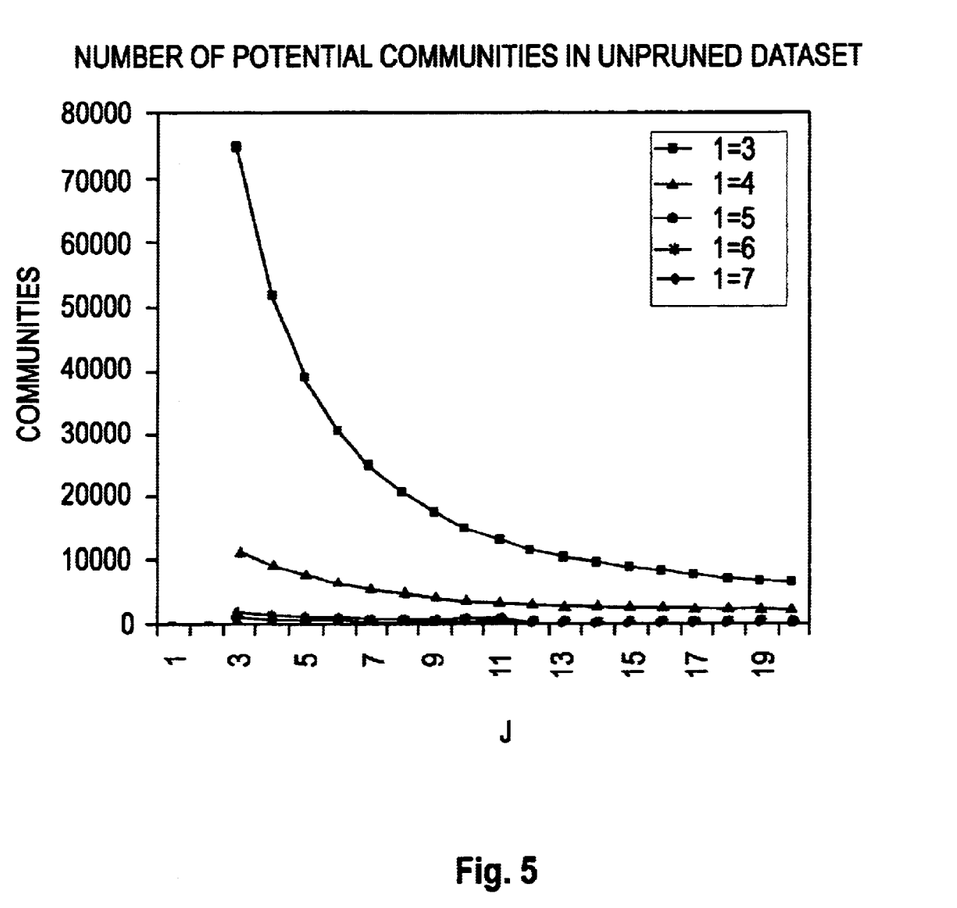
FIG. 5 is a graph showing the number of cores retained at each pruning step as a function of i and j.

Process for fixing j: Start with all (1, j) cores, which is simply the set of all vertices with out-degree at least j. All (2, j) cores are constructed by checking every fan which also cites any center in a (1, j) core. Compute all (3, j) cores likewise by checking every fan which cites any center in a (2, j) core, and so on. FIG. 5 is a graph showing the number of cores retained at each step as a function of i and j. The plot represents the number of edges remaining after the (3, 3) pruning step. Recall that the plot is cumulative. For instance, the number of (3, 3) cores (about 75 thousand) is the sum of all the possible cores of size at least (3, 3). Thus, it is an upper bound on the number of cores remaining after inclusion-exclusion pruning. FIG. 5 shows the maximum possible number of cores that could remain after the (3,3) pruning step. Curiously, the number of (3, 3) cores is smaller than, though comparable to, the number of cores found by the inclusion-exclusion step (about 135 thousand). Note that there are approximately 200 thousand potential communities in the test dataset. As the results in the next section show, it appears that virtually all of these cores correspond to real communities rather than coincidental occurrences of complete bipartite subgraphs. Given that the dataset is about a year and a half old, it seems safe to conjecture that there are at least as many communities in the Web today.

Evaluation of communities

First, the resulting communities were manually inspected. For this inspection, a random sample of 400 cores (200 (3,3) cores and 200 (3,5) cores) was picked from the resulting list.

Several parameters were studied to extrapolate inferences from the random sample.

Fossilization

Given an 18-month old crawl, the first question studied was how many of the community cores discovered would have been recoverable in today's Web. A fossil is a community core all of whose fan pages do not exist any more on the Web. Surprisingly, many of the community cores were recoverable as communities in today's Web. Of the 400 communities in the random sample, 122 communities, or roughly 30% were fossilized. The rest were still available ("live" communities). Given prevailing estimates of the half-life of Web pages (well under 6 months), it was surprising that fan pages corresponding to community cores are significantly longer-lived. This seems to be yet another indicator of the value of resource collections in the Web and consequently, the robustness of method of the invention.

Communities

Next, the communities them selves were studied. The following two examples given a sense of the communities that were identified. The first one deals with Japanese pop singer Hekiru Shina, which has the following fans:

awa.a-web.co.jp/~buglin/shina/link,html hawk.ise.chuo-u.ac.jp/student/person/tshiozak/hobby/heki/hekilink.html noah.mtl.t.u-tokyo-ac.jp/~msato/hobby/hekiru.html The next example deals with Australian fire brigade services with the following fans:

maya.eagles.bbs.net.au/~mp/aussie.html homepage.midusa.net/~timcorny/intrnatl.html fsino.cs.uni-sb.de/~pahu/links_australien.html Reliability One would be interested in knowing what fraction of the live cores were still cogent in that they covered a single characterizable theme. The cores were found to be surprisingly reliable. Of the 400 cores, there were 16 coincidental cores, i.e., a collection of fan pages without any cogent theme unifying them. This amounts to just 4% of our trawled cores. Given the scale of the Web and our usage of link information alone, one might expect a far larger fraction of accidental communities. It appears that the above pruning steps paid off here. Given the sample results, one can extrapolate that the fraction of fossils and coincidences together account for less than 35% of the cores that wee trawled. In other words, it is estimated that some 130K communities that are alive and cogent in today's Web are extracted.

Recoverability

A core is only part of a community. For communities that have not fossilized, can today's communities be recovered from the cores that were extracted? A method used for this purpose is to run the Clever search engine on a community core, using the fans as exemplary hubs (and no text query). For details on the Clever engine, see "Experiments in Topic Distillation," Proceedings of the ACM SIGIR Workshop on Hypertext Information Retrieval on the Web, Melbourne, Australia, 1998. Table 2 shows the top 15 hubs and authorities output of Clever, run on one of the cores generated by the method of the invention concerning the Australian Fire departments.

Quality

An interesting question is how many of the communities enumerated by the method of the invention are unknown to explicit ontological efforts such as Yahoo!? It was found that of the sampled communities, 29% were not in Yahoo! today in any form whatsoever. A far larger fraction would have been absent in an 18-month old crawl. This finding is interpreted as a measure of reliability of the trawling process, namely, that many of the communities emerging 18 months ago have now

TABLE 2

| Authorities | Hubs |
|---|---|
| NSW Rural Fire Service Internet Site | New South Wales . . . Australian Links |
| NSW Fire Brigades | Feuerwehrlinks Australien |
| Sutherland Rural Fire Service | FireNet Information Network |
| CFA: Country Fire Authority | The Cherrybrook . . . Brigade Home Page |
| The National Center . . . Children | New South Wales Fir . . . Australian Links |
| CRAFTI Internet Connexions - INFO | Fire Departments, . . . Information Netw |
| Welcome to Blackwoo . . . Fire Safety | The Australian Firefighter Page |
| The World Famous Guestbook Server | Kristiansand brannv . . . dens brannvesener |
| Wilberforce County Fire Brigade | Australian Fire Services Links |
| NEW SOUTH WALES FIRE 377 ST. | The 911 F.P.M., Fir . . . mp; Canada A Sec |
| Woronora Bushfire Brigade | Feuerwehrlinks Australien |
| Mongarlowe Bush Fire - Home Page | Sanctuary Point Rural Fire Brigade |
| Golden Square Fire Brigade | Fire Trails "I . . . ghters around the . . . |
| FIREBREAK Home Page | FireSafe - Fire and Safety Directory |
| Guises Creek Volunt . . . Home Page | Kristiansand Firede . . . departments of | emerged. Also, none of the trawled communities appear in less than the third level of the Yahoo! hierarchy, with the average level (amongst those present in Yahoo!) being about 4.5 and many communities that were as deep as 6 in the Yahoo! tree. Trawling a current copy of the Web will result in the discovery of many more communities that would become explicit in the future.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links and derives, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for pre-identifying implicitly defined communities including groups of pages of common interest from a collection of hyper-linked pages, wherein the communities have not been previously identified, comprising the steps of:

identifying a collection of hyperlinked pages from a plurality of sites, wherein each of the sites includes one or more hyper-linked pages;

identifying hyper-links between any two pages on a same site, wherein the same site is included within the plurality of sites;

removing the identified hyper-links between the two pages on a same site;

identifying a plurality of (i,j)-cores within the identified collection, the (i,j)-cores including a first set of hyper-linked pages and a second set of hyper-linked pages, wherein each page in the first set of hyperlinked pages points to every page in the second set of hyperlinked pages, and where i and i are the numbers of hyper-linked pages in the first set and hyper-linked pages in the second set, respectively, that appear in each of the identified (i,j)-cores; and expanding each of the identified (i,j)-cores into a fully community, the full community being a subset of the pages reading a particular topic.

2. The method as recited in claim 1 further comprising the step of discarding the pages of predetermined sites.

3. The method as recited in claim 1 further comprising the steps of:

finding highly similar pages that have different names;

replacing the highly similar pages with a single representative page; and redirecting any hyper-links that pointed to one of the highly similar pages so that the redirected hyper-links now point to the representative page.

4. The method as recited in claim 1, wherein the step of discarding includes the steps of:

determining candidate fan pages, the candidate fan pages being those pointing to at least a predetermined number of different sites;

determining candidate center pages, the candidate center pages being those pointed to by one or more candidate fan pages; and discarding all pages in the collection except the candidate fan pages and candidate center pages.

5. The method as recited in claim 4, wherein the determination of candidate fan pages is based on page content and the hyper-links pointing therefrom.

6. The method as recited in claim 1, wherein the step of finding a plurality of (i,j)-cores includes the steps of:

(a) discarding all candidate center pages that have fewer than i hyper-links pointing thereto;

(b) determining all candidate center pages that have i hyper-links pointing thereto and determining whether the i hyper-links represents a valid community core; and (c) if the i hyper-links represents a valid community core, then outputting the valid core, otherwise, discarding the determined candidate center pages.

7. The method as recited in claim 6 further comprising the steps of:

(d) discarding all candidate fan pages that have fewer than j hyper-links pointing therefrom;

(e) determining all candidate fan pages that have j hyper-links pointing therefrom and determining whether the j hyper-links represent a valid community core; and (f) if the j hyper-links represents a valid community core, then outputting the valid core, otherwise, discarding the determined candidate fan pages.

8. The method as recited in claim 7 further comprising the step of repeating steps (a)–(f) until every candidate fan page has more than j hyper-links pointing therefrom and every candidate center page has more than i hyper-links pointing thereto.

9. The method as recited in claim 7 further comprising the step of repeating steps (a)–(f) until a predetermined ending condition is satisfied.

10. The method as recited in claim 7 further comprising the steps of:

determining all (2,j) cores by examining all pairs of candidate fan pages;

for i=3 to n, where n is a predetermined value;

(i) finding all (i,j)-cores by examining the (i-1,j)-cores; and (ii) for each (i-1,j)-core, determining whether any of the candidate fan pages may be added to the (i-1, j)-core to yield a (i,j)-core; and removing all (i,j)-cores that appear as subsets of (i',j) cores, where i'>i.

11. A computer program product for use with a computer system for pre-identifying implicitly defined communities including groups of pages of common interest from a collection of hyper-linked pages, wherein the communities have not been previously identified, the computer program product comprising:

a computer-readable medium;

means, provided on the computer-readable medium, for identifying a collection of hyperlinked pages from a plurality of sites, wherein each of the sites includes one or more hyper-linked pages;

means, provided on the computer-readable medium, for identifying hyper-links between any two pages on a same site, wherein the same site is included within the plurality of sites;

means, provided on the computer-readable medium, for removing the identified hyper-links between the two pages on a same site;

means, provided on the computer-readable medium, for identifying a plurality of (i,j)-cores within the identified collection, the (i,j)-cores including a first set of hyper-linked pages and a second set of hyper-linked pages, wherein each page in the first set of hyperlinked pages points to every page in the second set of hyperlinked pages, and where i and j are the numbers of hyper-linked pages in the first set and hyper-linked pages in the second set, respectively, that appear in each of the identified (i,j)-cores; and means, provided on the computer-readable medium, for expanding each of the identified (i,j)-cores into a full community, the full community being a subset of the pages regarding a particular topic.

12. The computer program product as recited in claim 11 further comprising means, provided on the computer-readable medium, for directing the system to discard the pages of predetermined sites.

13. The computer program product as recited in claim 11 further comprising:

means, provided on the computer-readable medium, for directing the system to find highly similar pages that have different names;

means, provided on the computer-readable medium, for directing the system to replace the highly similar pages with a single representative page; and means, provided on the computer-readable medium, for directing the system to redirect any hyper-links that pointed to one of the highly similar pages so that the redirected hyper-links now point to the representative page.

14. The computer program product as recited in claim 11, wherein the means for directing to discard includes:

means, provided on the computer-readable medium, for directing the system to determine candidate fan pages, the candidate fan pages being those pointing to at least a predetermined number of different sites;

means, provided on the computer-readable medium, for directing the system to determine candidate center pages, the candidate center pages being those pointed to by one or more candidate fan pages; and means, provided on the computer-readable medium, for directing the system to discard all pages in the collection except the candidate fan pages and candidate center pages.

15. The computer program product as recited in claim 14, wherein the determination of candidate fan pages is based on page content and the hyper-links pointing therefrom.

16. The computer program product as recited in claim 11, wherein the means for directing to find a plurality of (i, j)-cores includes:

(a) means, provided on the computer-readable medium, for directing the system to discard all candidate center pages that have fewer than i hyper-links pointing thereto;

(b) means, provided on the computer-readable medium, for directing the system to determine all candidate center pages that have i hyper-links pointing thereto and determining whether the i hyper-links represents a valid community core; and (c) means, provided on the computer-readable medium, for directing the system to output the valid core if the i hyper-links represent a valid community core, otherwise, to discard the determined candidate center pages.

17. The computer program product as recited in claim 16 further comprising:

(d) means, provided on the computer-readable medium, for directing the system to discard all candidate fan pages that have fewer than j hyper-links pointing therefrom;

(e) means, provided on the computer-readable medium, for directing the system to determine all candidate fan pages that have j hyper-links pointing therefrom and determining whether the j hyper-links represents a valid community core; and (f) means, provided on the computer-readable medium, for directing the system to output the valid core if the j hyper-links represents a valid community core, otherwise, discard the determined candidate fan pages.

18. The computer program product as recited in claim 17, wherein the operation of means (a)–(f) is repeated until every candidate fan page has more than j hyper-links pointing therefrom and every candidate center page has more than i hyper-links pointing thereto.

19. The computer program product as recited in claim 17, wherein the operation of means (a)–(f) is repeated until a predetermined ending condition is satisfied.

20. The computer program product as recited in claim 17 further comprising:

means, provided on the computer-readable medium, for directing the system to determine all (2,j) cores by examining all pairs of candidate fan pages;

for i=3 to n, where n is a predetermined value;

(i) means, provided on the computer-readable medium, for directing the system to find all (i,j)-cores by examining the (i-1,j)-cores; and (ii) for each (i-1, j)-core, means, provided on the computer-readable medium, for directing the system to determine whether any of the candidate fan pages may be added to the (i-1, j)-core to yield a (i,j)-core; and means, provided on the computer-readable medium, for directing the system to remove all (i,j)-cores that appear as subsets of (i',j) cores, where i'>i.

21. A system for pre-identifying implicit defined communities including groups of pages of common interest from a collection of hyper-linked pages, wherein the communities have not been previously identified, comprising:

means for identifying a collection of hyperlinked pages from a plurality of sites, wherein each of the sites includes one or more hyper-linked pages;

means for identifying hyper-links between any two pages on a same site, wherein the same site is included within the plurality of sites;

means for removing the identified hyper-links between the two pages on a same site;

means for identifying a plurality of (i,j)-cores with the identified collection, the (i,j)-cores including a first set of hyperlinked pages and a second set of hyper-linked pages, wherein each page in the first set of hyperlinked pages points to every page in the second set of hyper-linked pages, and where i and j are the numbers of hyper-inked pages in the first set and hyper-linked pages in the second set, respectively, that appear in each of the identified (i,j)-cores; and means for expanding each of the identified (i,j)-cores into a full community, the full community being a subset of the pages regarding a particular topic.

22. The system as recited in claim 21 further comprising means for discarding the pages of predetermined sites.

23. The system as recited in claim 21 further comprising:

means for finding highly similar pages that have different names;

means for replacing the highly similar pages with a single representative page; and means for redirecting any hyper-links that pointed to one of the highly similar pages so that the redirected hyper-links now point to the representative page.

24. The system as recited in claim 21, wherein the means for discarding includes:

means for determining candidate fan pages, the candidate fan pages being those pointing to at least a predetermined number of different sites;

means for determining candidate center pages, the candidate center pages being those pointed to by one or more candidate fan pages; and means for discarding all pages in the collection except the candidate fan pages and candidate center pages.

25. The system as recited in claim 24, wherein the determination of candidate fan pages is based on page content and the hyper-links pointing therefrom.

26. The system as recited in claim 21, wherein the means for finding a plurality of (i, j)-cores includes:

(a) means for discarding all candidate center pages that have fewer than i hyper-links pointing thereto;

(b) means for determining all candidate center pages that have i hyper-links pointing thereto and determining whether the i hyper-links represent a valid community core; and (c) means for outputting the valid core if the i hyper-links represent a valid community core, otherwise, discarding the determined candidate center pages.

27. The system as recited in claim 26 further comprising:

(d) means for discarding all candidate fan pages that have fewer than j hyper-links pointing therefrom;

(e) means for determining all candidate fan pages that have j hyper-links pointing therefrom and determining whether the j hyper-links represent a valid community core; and (f) means for outputting the valid core if the j hyper-links represents a valid community core, otherwise, discarding the determined candidate fan pages.

28. The system as recited in claim 27, wherein the operation of means (a)–(f) is repeated until every candidate fan page has more than j hyper-links pointing therefrom and every candidate center page has more than i hyper-links pointing thereto.

29. The system as recited in claim 27, wherein the operation of means (a)–(f) is repeated until a predetermined ending condition is satisfied.

30. The system as recited in claim 27 further comprising:

means for determining all (2,j) cores by examining all pairs of candidate fan pages;

for i=3 to n, where n is a predetermined value:

(i) means for finding all (i,j)-cores by examining the (i-1,j)-cores; and (ii) for each (i-1, j)-core, means for determining whether any of the candidate fan pages may be added to the (i-1, j)-core to yield a (i,j)-core; and means for removing all (i,j)-cores that appear as subsets of (i',j) cores, where i'>i.

* * * * *